D. F. LUSE.
CORN GRADER.
APPLICATION FILED JULY 22, 1911.
1,043,019.
Patented Oct. 29, 1912.
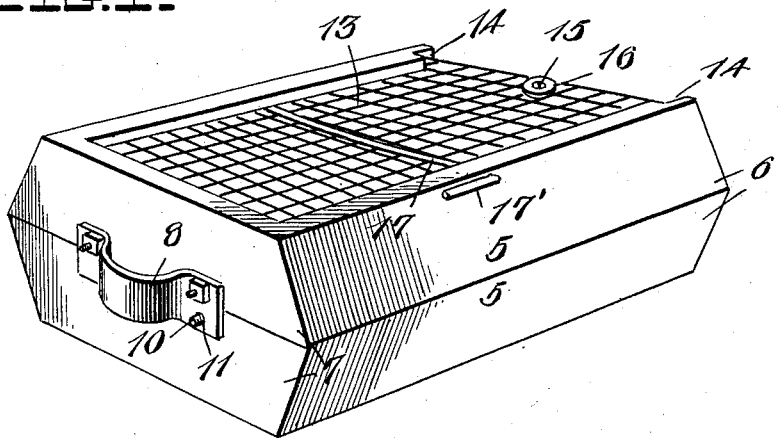
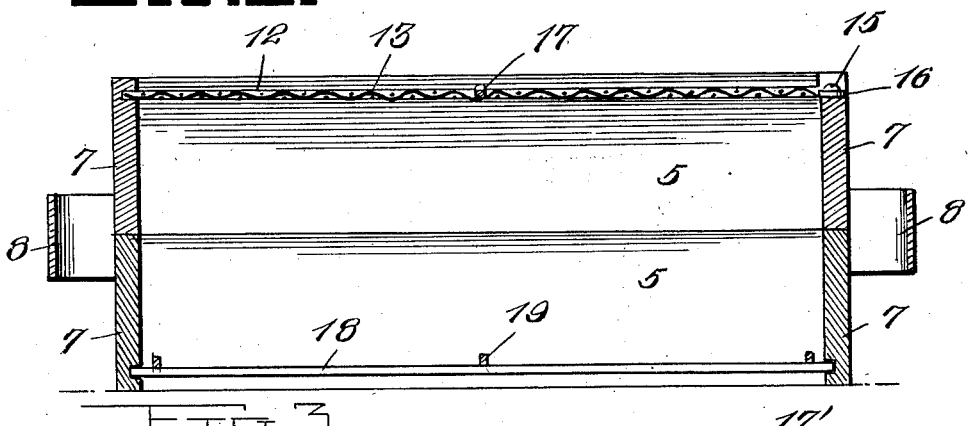
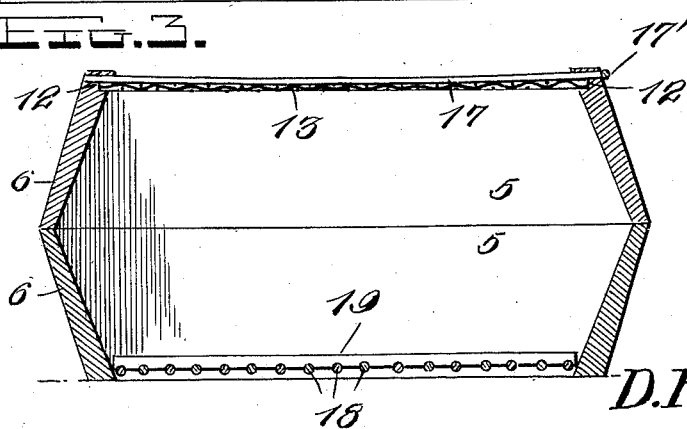
Witnesses
Chas. L. Griesbauer.
L. G. Ellis.
Inventor
D. F. Luse,
By Watson E. Coleman
Attorney

UNITED STATES PATENT OFFICE.

DANIEL F. LUSE, OF CENTER HALL, PENNSYLVANIA.

CORN-GRADER.

1,043,019.  Specification of Letters Patent. Patented Oct. 29, 1912.

Application filed July 22, 1911. Serial No. 639,942.

*To all whom it may concern:*

Be it known that I, DANIEL F. LUSE, a citizen of the United States, residing at Center Hall, in the county of Center and State of Pennsylvania, have invented certain new and useful Improvements in Corn-Graders, of which the following is a specification, reference being had to the accompanying drawings.

This invention relates to improvements in corn graders and more particularly to a hand operated grader, the invention having for its object to provide a device of this character whereby different sizes or varieties of corn may be graded.

A further and more specific object of the invention is to provide a grading box or frame and means for removably securing a grading screen in said frame, said screen forming the bottom of the grader in the use thereof.

A further object of the invention is to provide a corn grader, and means for removably securing a wire screen in the frame of the grader, whereby grading screens of different mesh may be utilized in connection with the frame for grading various varieties of corn.

With the above and other objects in view, the invention consists of the novel features of construction, combination and arrangement of parts hereinafter fully described and claimed, and illustrated in the accompanying drawings, in which—

Figure 1 is a perspective view of a corn grader embodying my improvements; Fig. 2 is a longitudinal section; and Fig. 3 is a transverse section.

Referring in detail to the drawing 5 designates the two sections of my improved corn grader which are preferably of rectangular pan-shape in form and consist of the inwardly inclined longitudinal side walls 6 and the end walls 7 which are rigidly secured to the side walls at their ends. One of the grader sections 5 has a handle plate 8 secured to each end thereof, and these handle plates extend above the upper edges of the end walls 7 and are engaged by the end walls of the other of the grader sections 5. The latter section is provided in one of its ends with a bolt 10 which is adapted to be disposed through an opening 11 in one end of the handle plate secured to the other grader section in that portion thereof which projects above the upper edge of the end wall 7.

The grader section to which the handles are secured has formed in its sides and in one end thereof the grooves 12 which are adapted to receive a wire screen 13. One of the ends of the side walls of said section is recessed or cut away in line with said grooves as indicated at 14 so that one end of the wire screen lies closely upon the edge of the other of the end walls of said section which is not provided with the groove. The insertion of the screen into the grooves in the side walls is also facilitated by the provision of these notches or cut-away portions 14. After fitting the edges of the wire grading screen into the grooves in the side and end walls of the grader section, said screen is rigidly secured to the other end wall thereof by means of the screw 15 which is threaded therein and bears upon a washer plate 16 arranged upon the shank of the screw between the head thereof and the screen. A rod 17 is rotatably mounted in the side walls of the grader section adjacent their grooved edges and is slightly bowed or bent and adapted to bear upon the screen 13 with sufficient pressure to cause the same to engage closely at its edges with the walls of the grooves 12. In this manner undue surface vibration of the screen is prevented. The end of the rod 17 is provided with a crank 17′ whereby said rod may be conveniently rotated to adjust the pressure thereof upon the screen. The other of the grader sections is also provided with a screening surface which consists of a plurality of rigid longitudinally disposed rods 18, the ends of which are set into grooves formed in the end walls 7 of the grader sections. These rods are arranged in spaced parallel relation and are maintained in their proper relative positions by means of the cross bars 19 which are provided with notches in one of their edges to receive said rods. Any desired number of these cross bars may be employed, but I preferably use three, one being located at each end of the grader and another centrally thereof.

In the use of my improved corn grader, the sections thereof are separated and the corn is placed in the section having the wire screen 13 arranged therein and forming its bottom. The other of the grader sections is then placed in position upon the edges of the first named section. The operator then agitates the grader and the corn is separated or graded according to the width thereof. Those grains which are of less width than the apertures formed by the screen wires will fall from the grader. The grader is then inverted so that the corn is disposed upon the longitudinal rods 18. The agitation of the grader is then continued and the corn is now separated or graded according to its thickness, such kernels falling into a suitable receptacle. In this manner a proper grade of corn for planting purposes is obtained. After separating all of the corn grains of one width from the contents of the grader, the screen 13 may be easily and quickly removed and another screen of wider mesh inserted in the grader section in lieu thereof. In this manner the corn may be separated into grades of various sizes without necessitating the removal of the contents from one grader to another after each grading operation.

From the foregoing description it will be seen that I have devised a very simple and efficient hand grader for corn which may be inexpensively manufactured. By providing the grader with the removable screen, one grader may be utilized for grading or separating all varieties of corn, and as these screens may be procured at an insignificant expense, it will be readily seen that the cost of grading the corn is reduced to a minimum.

While I have shown and described the preferred construction and arrangement of the various parts, it will be understood that the device is susceptible of considerable modification without departing from the essential feature or sacrificing any of the advantages thereof.

Having thus described the invention what is claimed is:—

In a corn grader the combination with a frame, a grading screen arranged in said frame and forming the bottom thereof, and a transversely disposed bowed tensioning rod rotatably mounted in the longitudinal walls of said frame adjacent to their edges adapted to bear upon the screen when rotated, one end of said rod extending beyond the frame wall and being disposed at an angle to provide a handle whereby said rod may be turned.

In testimony whereof I hereunto affix my signature in the presence of two witnesses.

DANIEL F. LUSE.

Witnesses:
J. M. COLDROW,
CHAS. D. BARTHOLOMEW.

---

Copies of this patent may be obtained for five cents each, by addressing the "Commissioner of Patents, Washington, D. C."